Feb. 6, 1940.  J. FRIED  2,189,393
TOWING REACH FOR AUTOMOBILES
Filed March 9, 1938  2 Sheets-Sheet 2
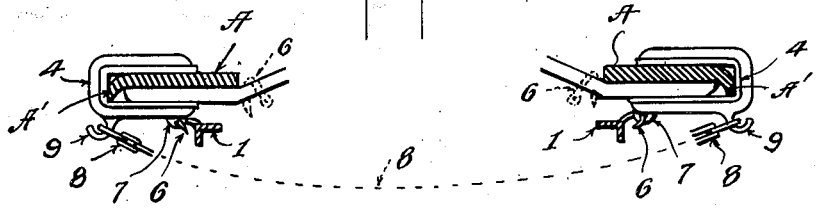
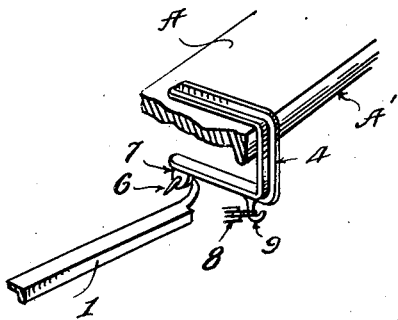
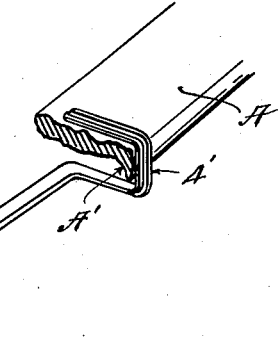
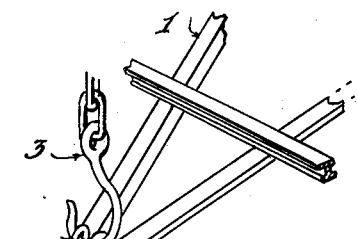
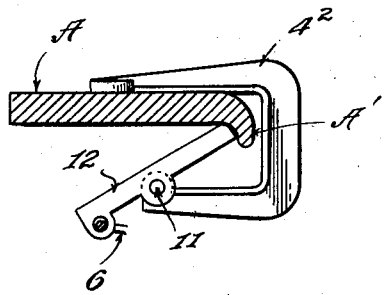
Inventor
J. Fried,
By L. M. Thurlow
Attorney Patented Feb. 6, 1940

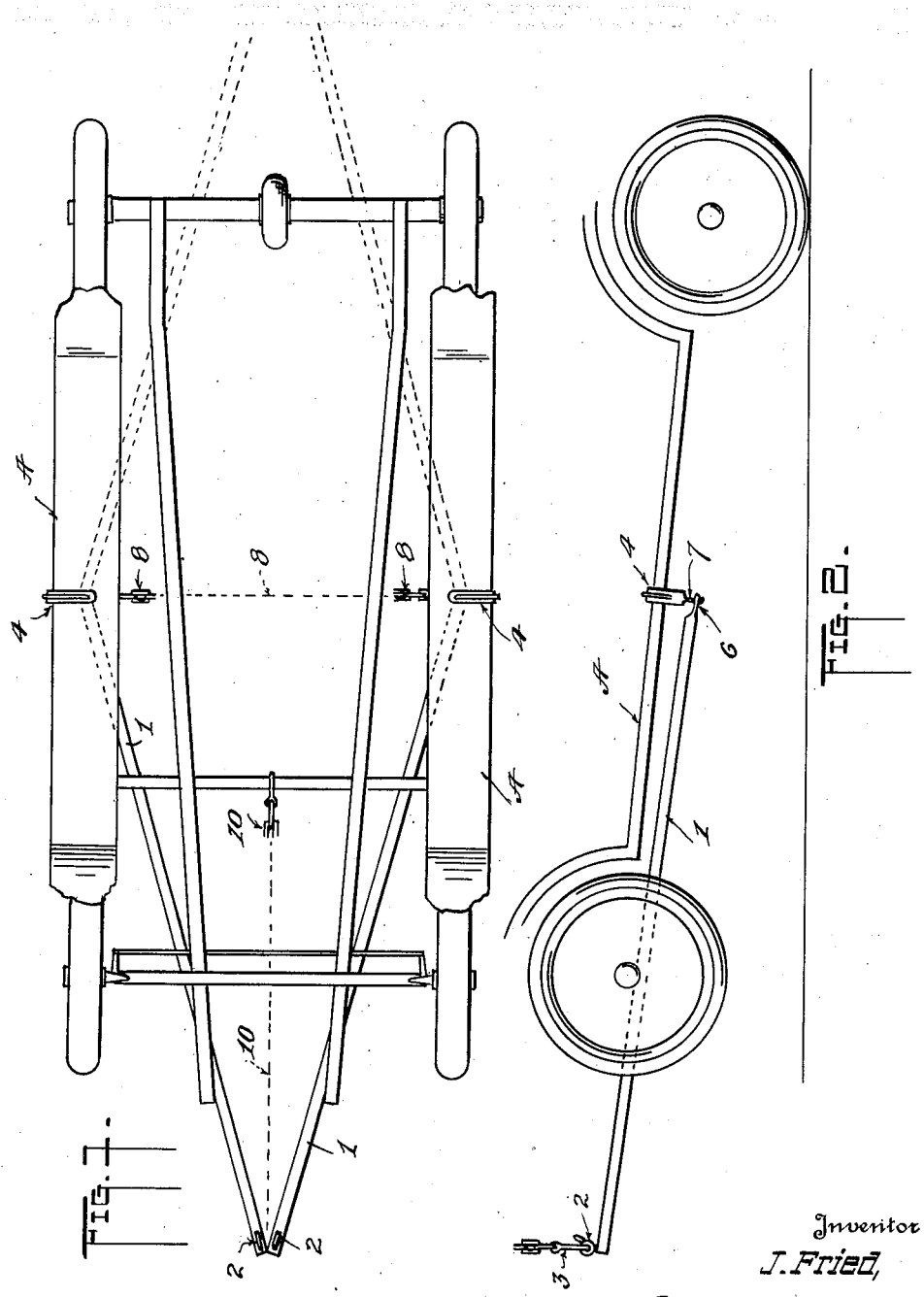

2,189,393

UNITED STATES PATENT OFFICE 2,189,393

TOWING REACH FOR AUTOMOBILES

John Fried, Peoria, Ill.

Application March 9, 1938, Serial No. 194,806

4 Claims. (Cl. 294—82)

This invention has reference to means for use in towing wrecked automobiles or such of this type of vehicle, at least, as cannot be transported or dragged to an institution for repairs except upon either its front or rear wheels.

More particularly the invention has to do with a support to extend beneath the chassis of an automobile for supporting one end or the other thereof and attached beneath the same to some portion of the structure.

An object of the invention, therefore, is that of placing beneath either axle of an automobile a reach structure one extremity of which is in attached relation to the running boards or some other portion of the car, the other end being adapted to be supported on the lifting crane of a so called "wrecking car" the weight of the car to be transported resting partly upon one of its set of usable wheels and the balance upon the said reach.

Another object is to provide a simple form of device so appointed and fashioned that it may be very quickly and easily placed in secure position beneath a car and as quickly and easily removed, and employed as the lifting or supporting structure for part of the weight thereof and act as the drag member at the same time.

The appended drawings forming part hereof illustrates the invention and will serve to make the same clear aided by the following description:

Figure 1 is a plan of a sufficient structure of an automobile to illustrate the use of my invention, the said invention being shown in position therebeneath.

Figure 2 is a side elevation of parts of a car, also, and the invention in place thereon.

Figure 3 is a transverse section of a pair of so called "running-boards" and parts of the invention shown in position thereon.

Figure 4 illustrates in perspective part of a reach and a member shown applied to a running-board, Figure 5 illustrates in perspective a slight modification of the reach and member shown in Figure 4 and Figure 6 is a side elevation of modified form of a certain part of the structure shown in Figures 3 and 4.

As distinguished from many devices of the purpose named, my structure, including a reach, is designed to be placed beneath the automobile and engaged at its far end with some part of the structure of said car such, for example, as in the present instance, with the running boards thereof, no special means being required for such engagement. The place of engagement since beneath the car the said reach supports that part of the weight of the car not carried by the pair of carrying or ground wheels of said car that may be usable. The device therefore may be simple and entirely devoid of special fastening means and due to the member of application constitutes a thoroughly dependable towing arrangement.

In the drawings the running-boards represented at A of an automobile are shown in this instance only, as the parts employed to be engaged by my type of device. Again, in the present instance a draft member or reach is provided comprising, preferably, a pair of rigid members 1 such as angle iron or other dependable type. In any event at the forward end thereof one or more eye members 2 may be conveniently provided to receive a hook 3 of any usual lifting derrick of a wrecking-car, neither of which two latter is shown.

Each of the rear divergent ends may carry a hook shaped member 4 of any desired type for engaging about some portion of the chassis of the car to be hauled. This hook member may be integral with the member 1 as shown in Figure 5, the same having the form of a U, as 4', disposed substantially at right angles to the length of said member, the hook of each member lying astride a running board as illustrated. Or the members may each have a hook extension 6 as in Figure 4 to engage in an eye 7 of said U member 4. As a matter of convenience the use of such as the U member is preferred since one of them may be slipped loosely upon an always convenient running-board to hang thereon without fastening means of a type being required. That is to say, since the reach made up of the members 1 lies beneath the car's gearing, the weight of that end of car to be lifted is supported thereon by its axle, for example, as the lifting hook 3 is raised by the derrick, not shown, with the result that the leverage placed on said reach, Figure 2, places a downward strain on the member 4 at the running-board creating great friction of that member upon the latter and permitting the vehicle to be transported on either its usable rear, or front ground wheels, as the case may be.

In the latter connection, it is observed in Figures 1 and 2 that the reach 1 is shown as extending from and carrying the front end of a car. If, however, the front wheels are in running condition while the rear wheel may be useless for supporting the car the reach may be extended at the rear of the vehicle as denoted in broken lines. It is to be observed that the reach members 1 extend from the U-portions at those ends thereof distant from the yoke portions whereby the weight of said members and the downward pull of the same will tend to retain said U-portions in position by frictional engagement with the running-boards.

Since the reach members 1 converge from the member 4', or the hooks 6, as the case may be, the natural tendency during the dragging act is to prevent the members 4 moving in a direction away from each other so that neither of them can leave the running-board. However, if desired a chain 8 or other device may be employed to connect said members 4 by attaching the same to a hook 9 on each said member.

It is to be understood that the said members 4 in either of Figures 3 and 4 may be attached to any portion of the vehicle other than the running-board, as already intimated, or that the hook 6 of the reach, when that form is used, may be attached to any convenient part without the requirement of said member 4.

If desired, of course, a chain 10 may be connected at the forward end of the reach and to any part of the vehicle structure as an additional drag member, more especially when the vehicle is to traverse rough roads.

In Figure 6 is illustrated a modified form 42 of the member 4. As before, this is of U form to whose suspended free limb is pivoted at 11 a latch 12 the named hook 6 being linked thereto at its outer end. Especially when the running board is made of steel, as is now customary, a lip or flange A' depends from its outer edge so that in a tilting of the named latch 12 the free or inner end thereof due to the weight of the member 1 and the weight thereon will automatically carry said inner end upwardly behind said lip or flange A' to thereby serve to lock the member 42 permanently in place, and thus a cross chain such as 8 be unnecessary. And where the end having said hook 6 is the weighted end the device will be automatically locked in position when the device is slipped to position upon the running-board.

While I have described a particular form of reach or one consisting of divergent members whose spaced extremities are connected to a part of the vehicle at opposite ends thereof, such reach may be of any other form as long as it has two spaced ends for attaching to such parts of the vehicle and includes a portion extending from beneath the latter for attachment to lifting towing device.

I claim:

1. A towing reach for automobiles comprising a pair of members free of each other adapted at one of their ends for attachment to a common lifting-connection and diverging from said ends, their divergent ends each terminating in a hook, and a pair of U-shaped members each adapted to engage upon a running board of the vehicle to be towed, a limb of each portion having an eye at the end thereof farthest from the yoke extremity of the member, said eye adapted to receive one of the hooks of the named members therethrough.

2. The invention according to claim 1 including a chain connecting the portions in the mounted position of the latter, said chain being detachable from the portions.

3. A towing reach for automobiles comprising a pair of members free of each other adapted at one of their ends for attachment to a common lifting-connection and diverging from said ends, their divergent ends each terminating in a hook, and a pair of U-shaped members each adapted to engage upon the running board of the vehicle to be towed, a latch pivoted between its ends upon a limb of each of the members distant from the yoke extremity thereof, each latch having an eye at one end adapted to receive the hook of one of the members, the weight of the member adapted to tilt the latch and maintain the free end of the latter in engagement with the under portion of the running-board.

4. A towing reach for automobiles comprising a pair of members adapted at one of their ends for attachment to a common lifting connection and diverging toward their other ends, a pair of U-shaped members each adapted to engage over the free edge of a running board of the vehicle to be towed, each of the first named members at its divergent end having a linked connection with one of said U-shaped members on a limb of the same distant from the yoke extremity thereof, said link connection permitting free movement of a U-shaped member with respect to the member with which it is associated.

JOHN FRIED.